US008608197B2

(12) United States Patent
Eckert et al.

(10) Patent No.: US 8,608,197 B2
(45) Date of Patent: Dec. 17, 2013

(54) AIRBAG MODULE FOR A MOTOR VEHICLE

(71) Applicant: Takata AG, Aschaffenburg (DE)

(72) Inventors: Nick Eckert, Berlin (DE); Frank Wollny, Berlin (DE); Andre Buchholz, Berlin (DE); Axel Heym, Berlin (DE); Matthias Böse, Berlin (DE); Rolf Lazar, Berlin (DE); Marc Prost-Fin, Berlin (DE); Thomas Hofmann, Aschaffenburg (DE); Tobias Fechner, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/712,746

(22) Filed: Dec. 12, 2012

(65) Prior Publication Data
US 2013/0119645 A1 May 16, 2013

Related U.S. Application Data

(63) Continuation of application No. PCT/EP2011/005961, filed on Jun. 9, 2011.

(30) Foreign Application Priority Data

Jun. 15, 2010 (DE) .......................... 10 2010 024 384
Aug. 27, 2010 (DE) .......................... 10 2010 039 895
Jan. 6, 2011 (DE) .......................... 20 2011 001 429

(51) Int. Cl.
*B60R 21/276* (2006.01)
(52) U.S. Cl.
USPC ...................................... 280/739; 280/728.2

(58) Field of Classification Search
USPC ............................................... 280/739, 728.2
See application file for complete search history.

(56) References Cited

U.S. PATENT DOCUMENTS

| 6,517,108 | B1 | 2/2003 | Vinton et al. |
| 2004/0012179 | A1 | 1/2004 | Pinsenschaum et al. |
| 2007/0040366 | A1 | 2/2007 | Maidel et al. |
| 2009/0160169 | A1 | 6/2009 | Parks et al. |

FOREIGN PATENT DOCUMENTS

| DE | 10 2005 039 418 A1 | 3/2007 |
| EP | 1769978 A1 | 4/2007 |
| GB | 2306409 A | 5/1997 |
| WO | WO 2009/034752 A1 | 3/2009 |

OTHER PUBLICATIONS

International Search Report PCT/EP2011/059614 dated Apr. 11, 2011.

*Primary Examiner* — Drew Brown
(74) *Attorney, Agent, or Firm* — Foley & Lardner LLP

(57) ABSTRACT

An airbag module for a motor vehicle is provided. The airbag module comprising a gas bag, which is inflatable by means of a gas generator for the protection of a person, and a vent opening through which gas originating from the airbag module can escape, and a device for controlling the outlet cross-section of the vent opening, which comprises at least one covering member with which the vent opening can be covered, in order to at least partly close the same, and which furthermore comprises an actuating mechanism which cooperates with the covering member, in order to vary the outlet cross-section of the vent opening. The actuating mechanism includes a gas source and an element inflatable by means of the gas source, which during inflation cooperates with the covering member such that it effects a change in the outlet cross-section of the vent opening.

20 Claims, 15 Drawing Sheets

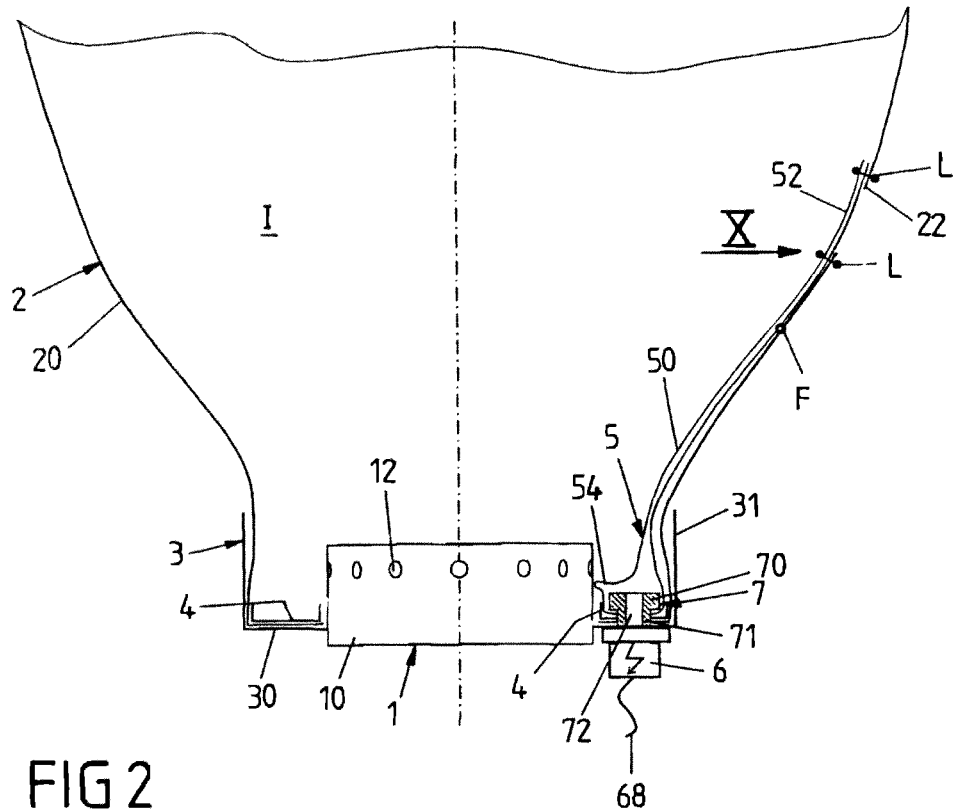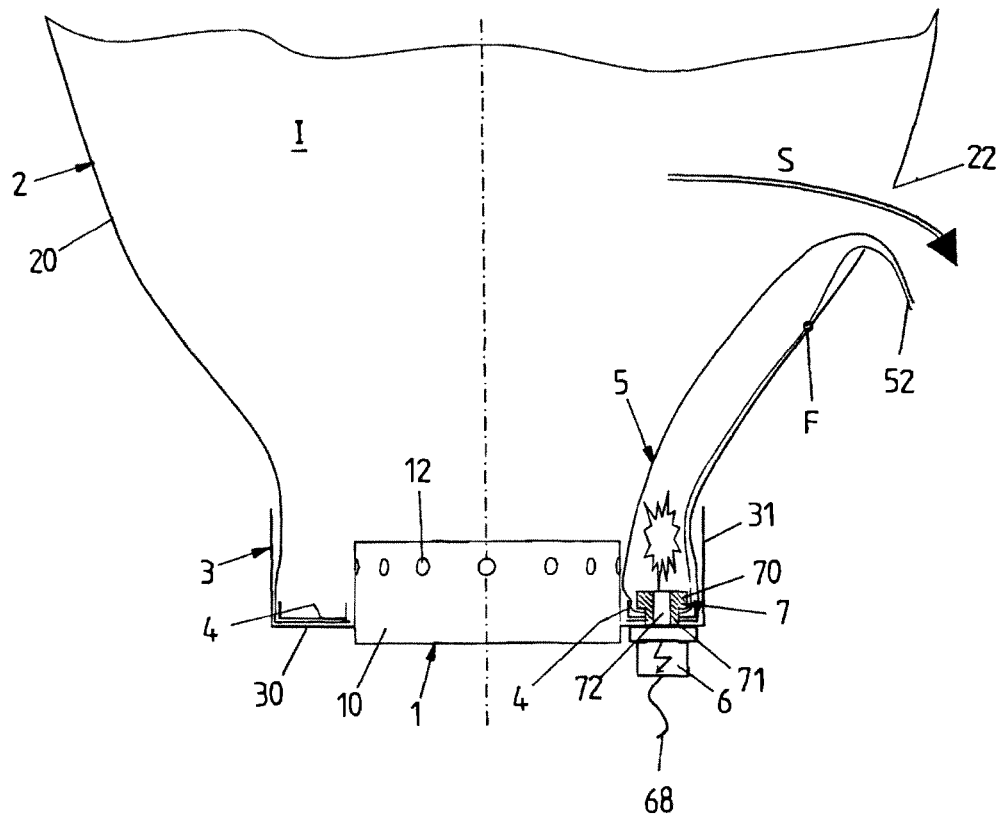

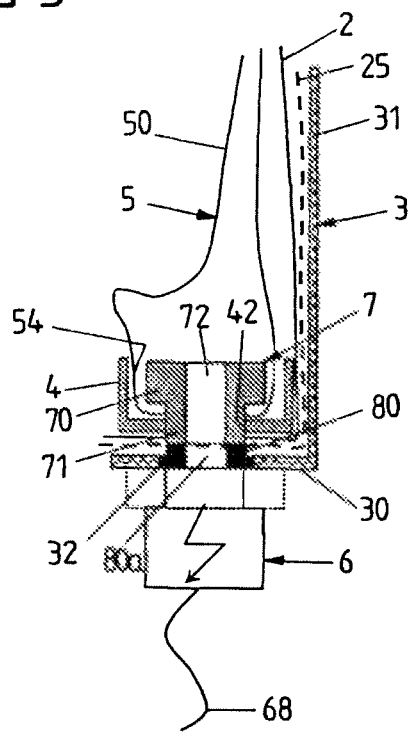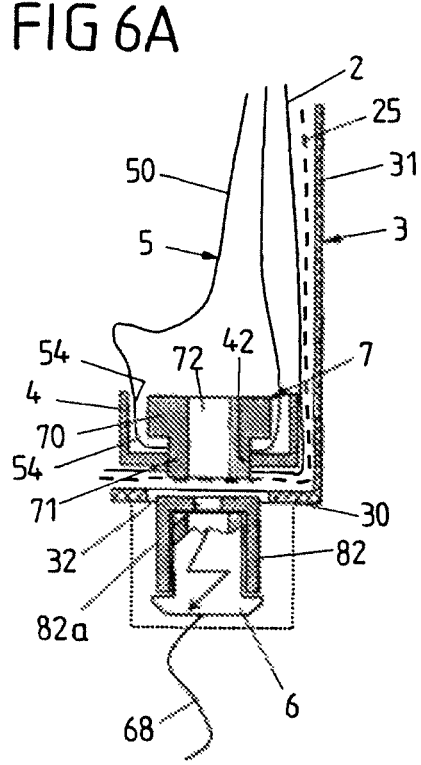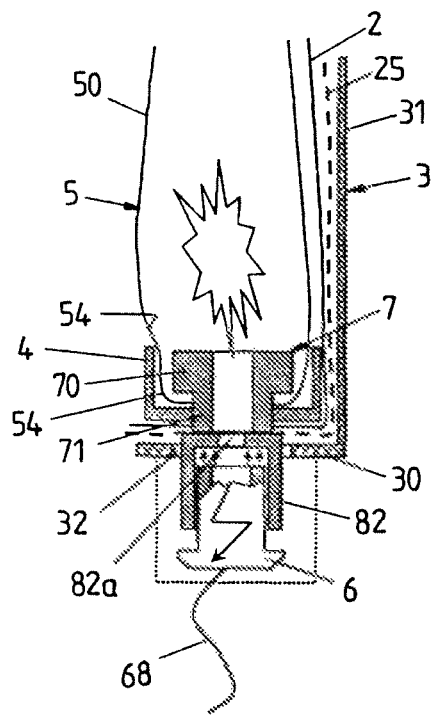

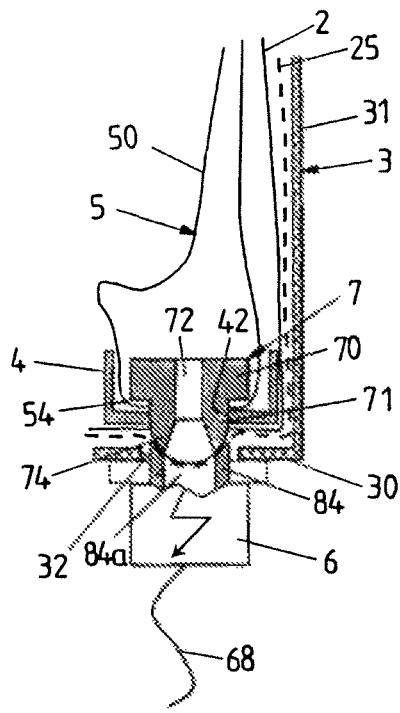
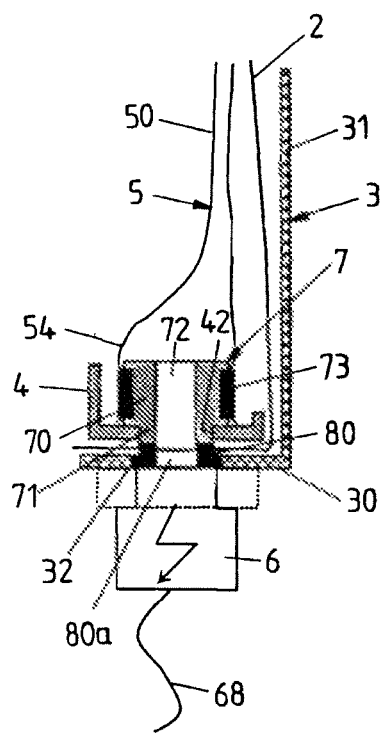
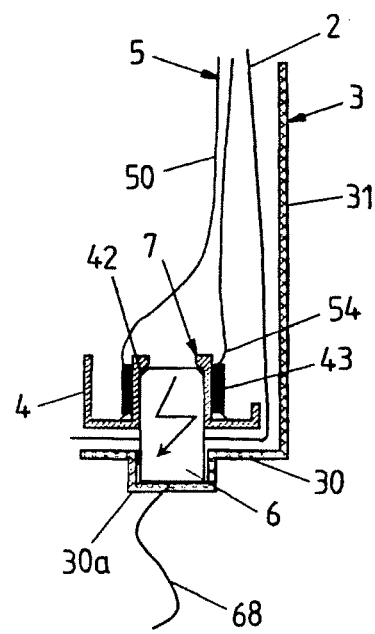
FIG 7
FIG 8
FIG 9

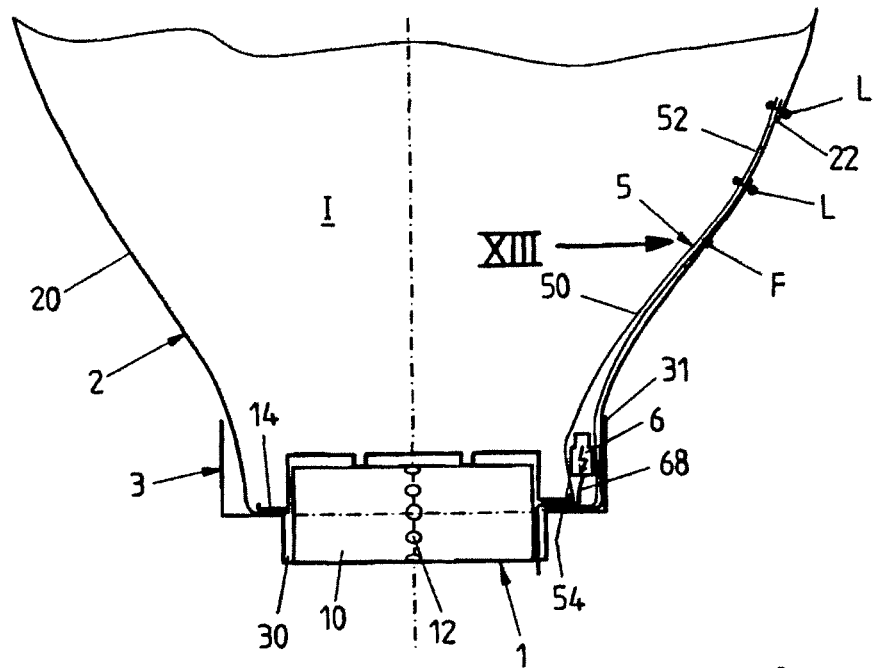
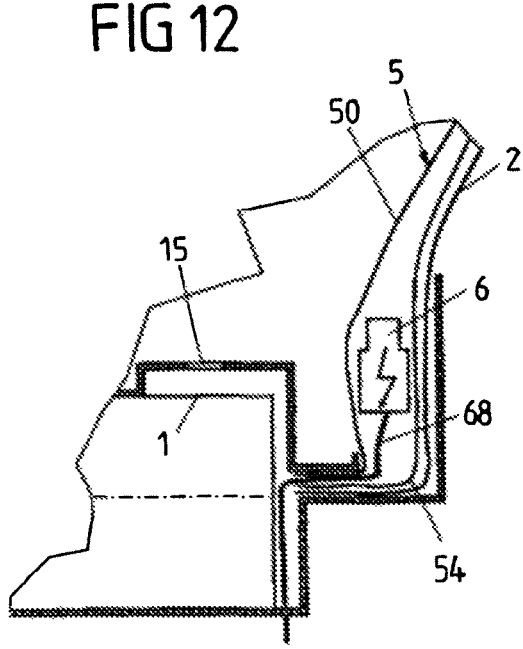
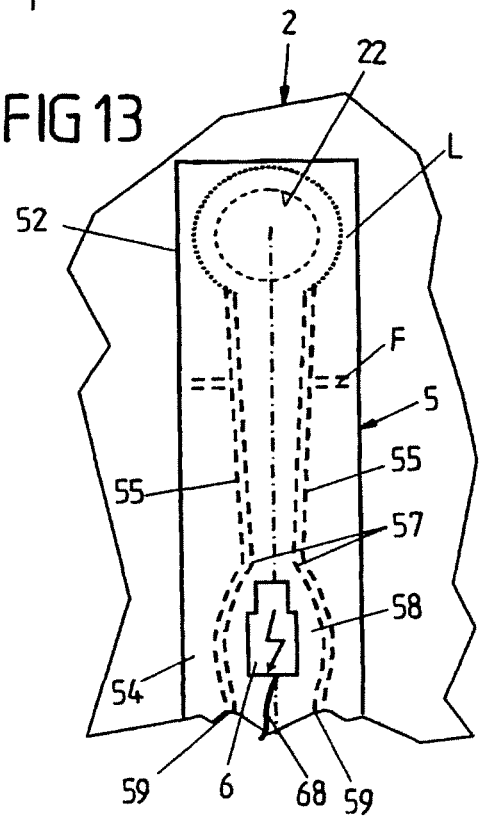

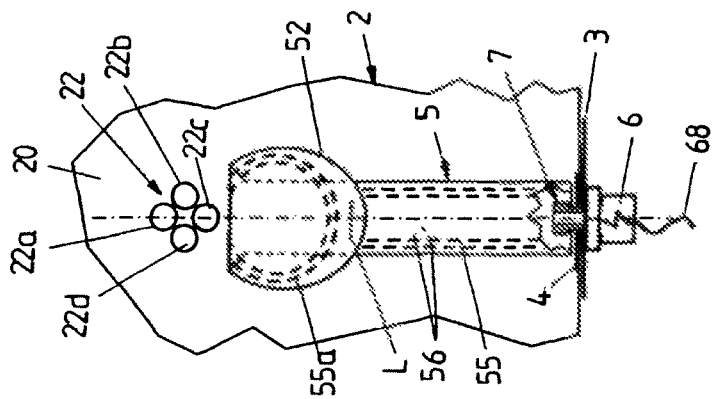
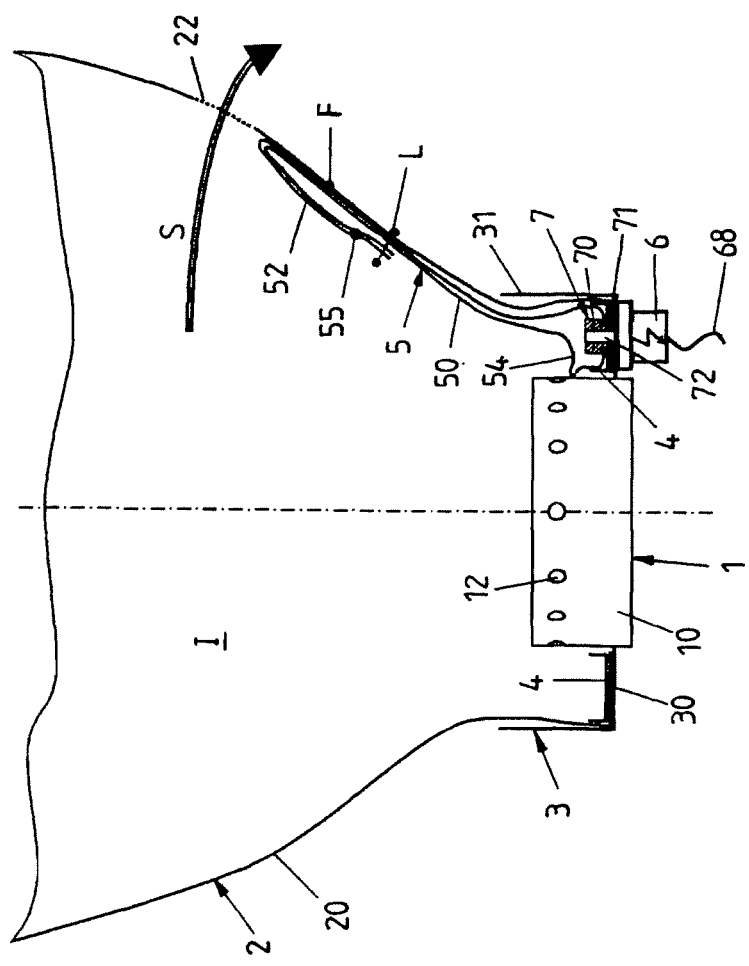

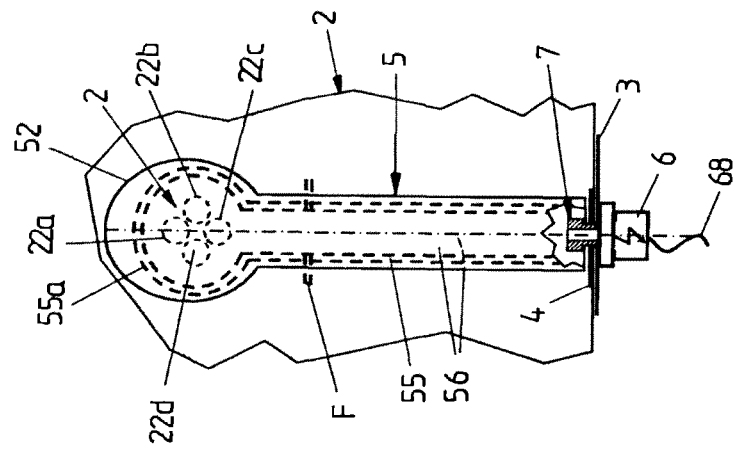
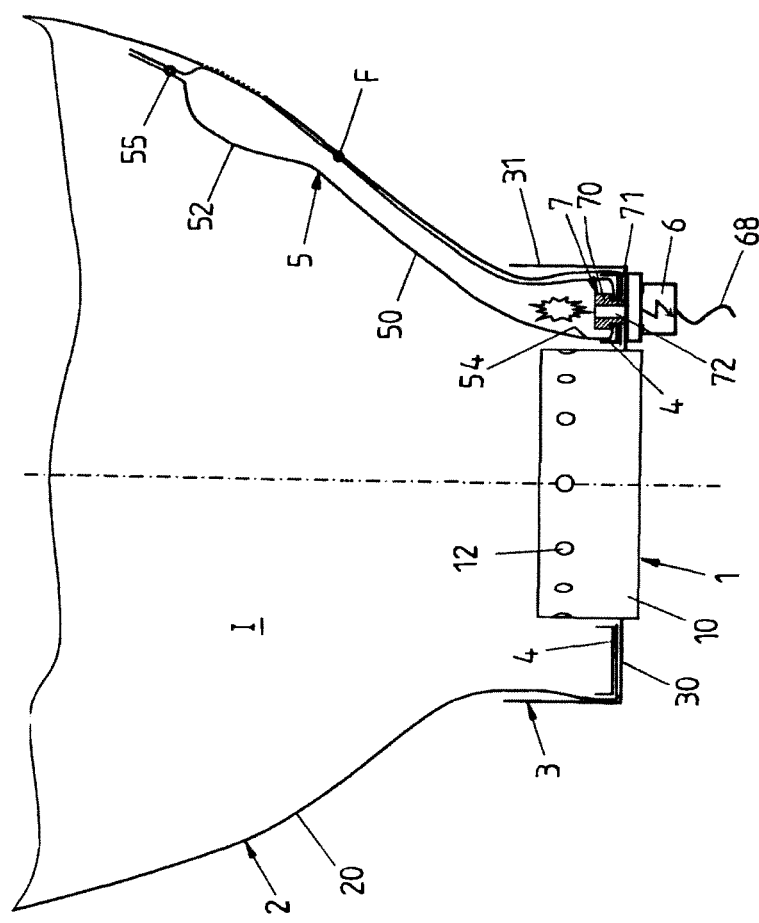

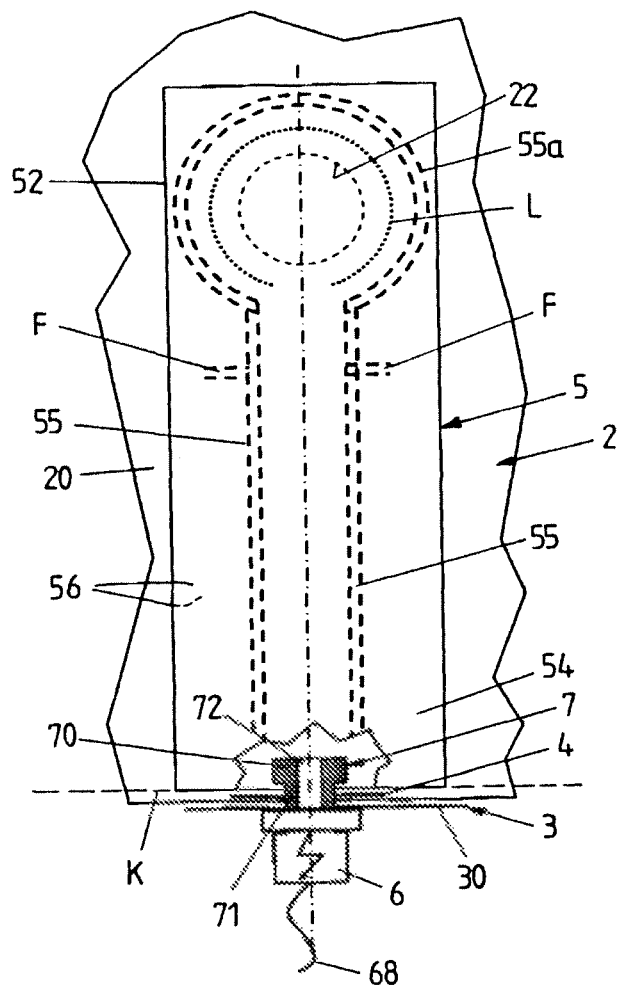
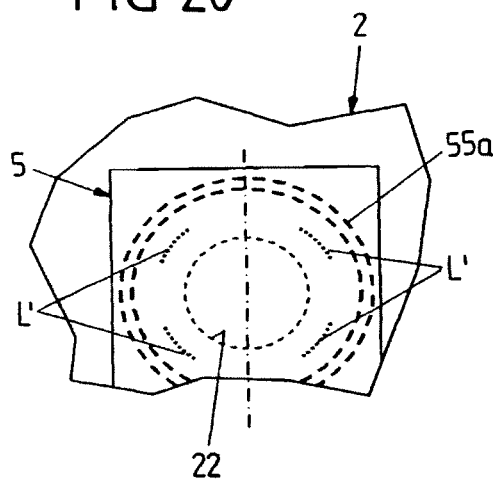
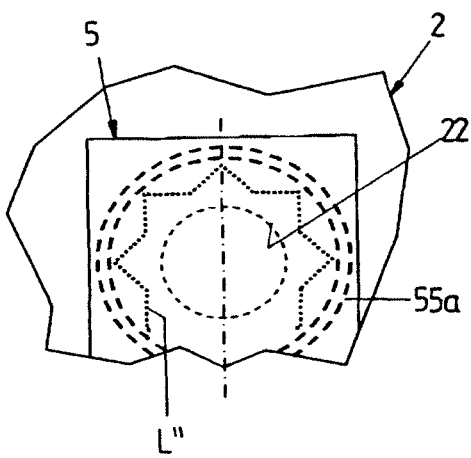

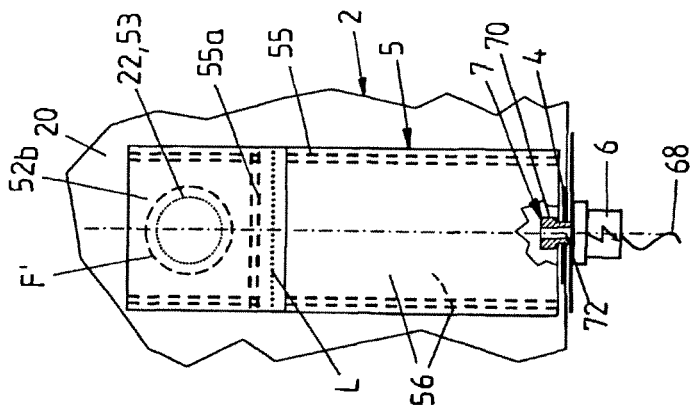
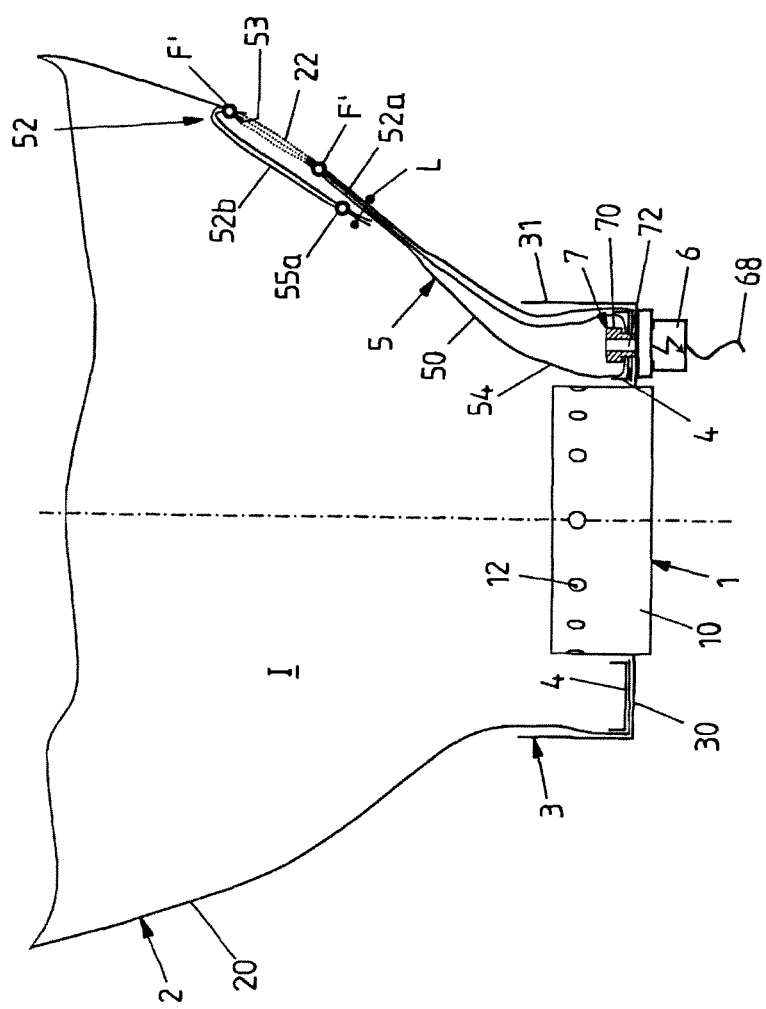

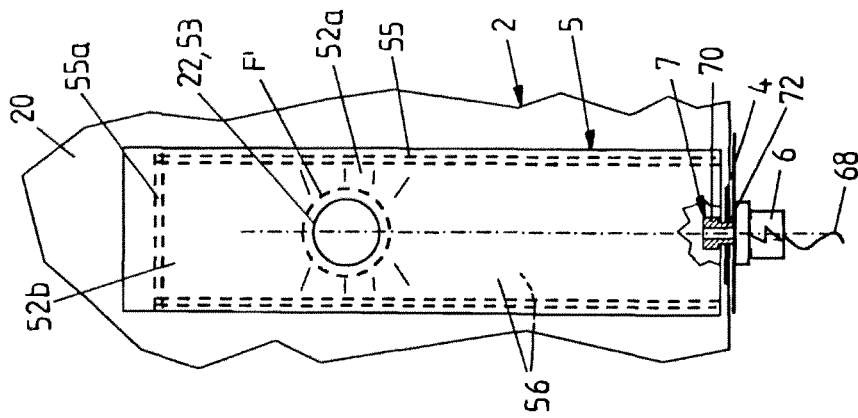
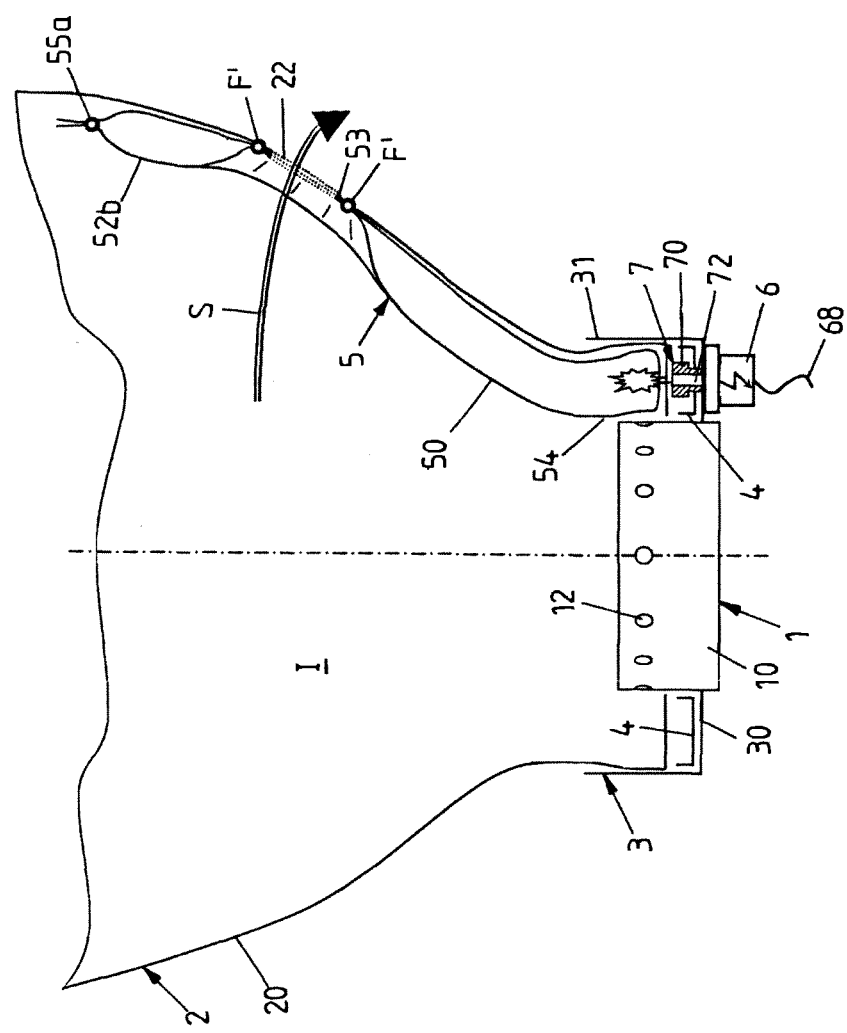

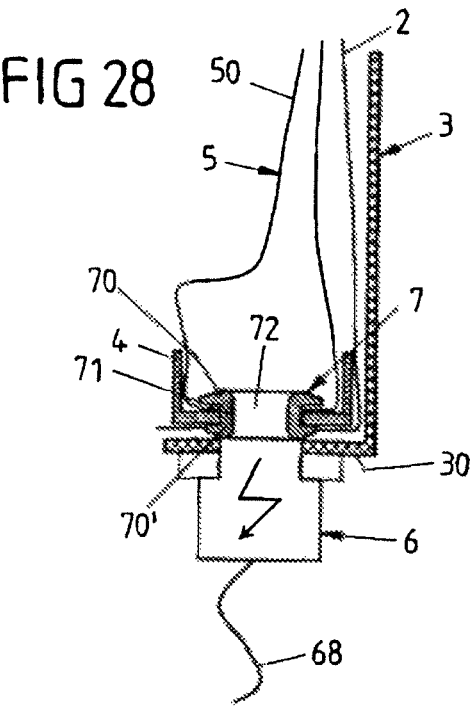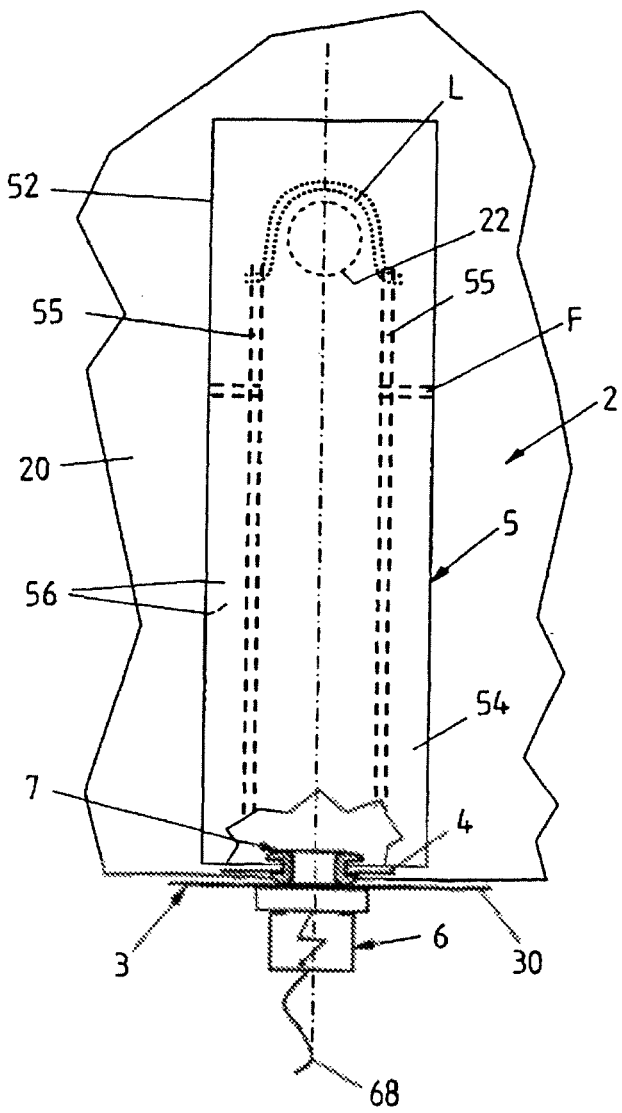

AIRBAG MODULE FOR A MOTOR VEHICLE

CROSS-REFERENCE TO RELATED PATENT APPLICATIONS

This application is a continuation of International Patent Application PCT/EP 2011/059614, filed Jun. 9, 2011, which was published in German as WO 2011/157631. The foregoing international application is incorporated by referenced herein.

BACKGROUND OF THE INVENTION

This invention relates to an airbag module for a motor vehicle.

Such airbag module comprises a gas bag, which is inflatable by means of a gas generator for the protection of a person, and at least one vent opening through which gas originating from the airbag module (which was released by the gas generator for inflating the gas bag) can escape (exit) from the airbag module, and furthermore a device for controlling the outlet cross-section of the vent opening, which includes at least one covering member with which the vent opening can be covered, in order to at least partly close the same, and which furthermore includes an actuating mechanism which cooperates with the covering member, in order to vary the outlet cross-section of the vent opening.

With such a device it is possible to selectively control the so-called venting of a gas bag, i.e. the draining of those gases which were released by a gas generator and introduced into the gas bag for the protection of a vehicle occupant, for example in dependence on the kind and severity of an accident and on the size and/or the weight and/or the seating position of the person to be protected, which can be detected in particular by means of sensors.

It presently is provided that the actuating mechanism includes a gas source and an element inflatable by means of the gas source, which during inflation cooperates with the covering member such that it effects a change in the outlet cross-section of the vent opening.

The gas source for example can be ignited pyrotechnically (sensor-controlled) and then releases a gas with which the inflatable element is filled, whereby it cooperates with the covering member associated to the vent opening or acts on the same, so that the outlet cross-section is not changed in the end.

According to one variant, the covering member can originally cover the vent opening, so that the actuating mechanism is provided, in order to (at least partly) clear the vent opening by acting on the covering member. Alternatively, the vent opening can be exposed originally and the covering member can be acted upon by the actuating mechanism such that the vent opening is (at least partly) closed. It is also possible that the covering member initially partly covers the vent opening and the degree of coverage is changed by the action of the inflatable element.

An airbag module as mentioned above is known from DE 10 2005 039 418 A1.

In such airbag module, one difficulty consists in the suitable fixation of the inflatable element which serves for controlling the outlet cross-section of the vent opening.

SUMMARY OF THE INVENTION

The problem underlying the invention consists in creating an airbag module as mentioned above, which provides for an assembly-friendly and reliable arrangement and fixation of the inflatable element.

According to an exemplary embodiment of the invention the inflatable element is attached to a module component in the surroundings of the gas source, which serves the fixation and/or the accommodation of the gas bag on or in the airbag module.

As a result, module components substantially present anyway can be employed for the fixation or attachment of the inflatable element on its gas-source-side end portion, namely those module components which anyway are required for the fixation and/or accommodation of the gas bag.

The vent opening variable in terms of its outlet cross-section by means of the inflatable element and a covering member in particular can be provided on the gas bag itself; however, vent openings arranged at another point of the airbag module also can be controlled with the arrangement according to the invention, for example a vent opening provided in the module housing.

The inflatable element can form a gas duct which extends from the gas source to the covering member which is associated to the vent opening.

In the region of its gas-source-side end portion, the inflatable element can be attached to a module component of the airbag module in the surroundings of the gas source, for example by means of at least one additional fastening element provided for this purpose, and in particular on a module component which during inflation of the gas bag does not substantially change its position in the airbag module. This means that it is a module component which during inflation of the gas bag, so that the same expands or is deployed in direction of a vehicle occupant to be protected, does not move along with the expanding or deploying gas bag.

According to one exemplary embodiment of the invention said module component is arranged in the interior of the gas bag.

In this case in particular (but not exclusively) the module component for example can be fanned by a holding member which serves the clamping fixation of the gas bag in the region of its inflation opening on the airbag module. In concrete terms, the module component for example can be a generator support for a gas generator, a diffuser for distributing a gas stream exiting from the gas generator, or a retaining ring extending beside the gas generator, wherein a component with a dual function can of course also be provided, i.e. for example a diffuser to which at the same time a retaining ring is integrally molded or which also serves as generator support.

According to another exemplary embodiment, the inflatable element is fixed on a module component in which the gas bag is arranged before inflation or which adjoins the gas bag. For example, this can be a module housing or a generator support.

According to an exemplary development of the invention, the at least one fastening element, which is provided for attaching the inflatable element to a module component, is provided with a through opening through which the gases exiting from the gas source can flow into the inflatable element.

Furthermore, it can be provided that the vent opening is enclosed by a releasable fixation of the covering member on the envelope of the gas bag.

The covering member can be a part separate from the inflatable element, on which—upon activation of the gas source—the inflatable element or the gases released from the gas source into the inflatable element act such that it changes its location/position with respect to the vent opening, which in turn effects a change in the outlet cross-section of the vent opening. For this purpose, the covering member also can be attached to the inflatable element as separate part. Furthermore, the covering member also can directly be formed by a portion of the inflatable element itself, so that it contributes for example to a limitation of the interior space of the inflatable element to be filled with gas.

The inflatable element can firmly be closed on its covering-part-side end portion, for example in that on an end portion in the region of the covering member the inflatable element is closed by an additional connecting region.

According to a further exemplary variant of the invention, the covering part for closing the vent opening initially rests on the vent opening with two sections, of which the one section includes a through opening through which gas can exit from the gas bag and the associated vent opening, and of which the other section closes the vent opening together with the through opening.

It can furthermore be provided that the one section is firmly, i.e. durably, connected with the gas bag, whereas the other section is releasably connected with the gas bag and/or the first section, so that the last-mentioned connection can be undone when the inflatable element is filled with gas and the other section can be moved. It can thus be achieved that during inflation of the inflatable element the other section is moved away from the vent opening and the through opening and clears the same for the exit of gas from the gas bag. The movement of the other section of the inflatable element in particular can be a folding movement, so that said section is folded away from the vent opening and the through opening.

Thus, it can be provided
that the other section can be folded over such that during inflation of the inflatable element it is not moved into the vent opening,
that the other section can be folded about a connection via which the one section is connected with the gas bag, and/or
that the releasable connection of the other section delimits a region of the inflatable element to be filled with gas, so that when filling the inflatable element with gas, the releasable connection is loaded by the increasing expansion of the region to be filled with gas.

With this variant of the invention it can in particular be achieved that the vent opening can be cleared for the exit of gas from the gas bag without having to push the material of the covering member into or through the vent opening.

BRIEF DESCRIPTION OF THE DRAWINGS

Further details and advantages of the invention will become apparent from the following description of exemplary embodiments with reference to the Figures.

FIG. 1 shows a schematic representation of an airbag module with partly filled gas bag.

FIG. 2 shows the airbag module of FIG. 1 after clearing a vent opening of the gas bag.

FIG. 5 shows a detail representation of parts of an actuating mechanism in the form of a pyrotechnical device for controlling the outlet cross-section of the vent opening on the gas bag as shown in FIG. 1.

FIG. 6A shows a modification of the arrangement of FIG. 5.

FIG. 6B shows the arrangement of FIG. 6A after an activation of the pyrotechnical device.

FIG. 7 shows a second modification of the arrangement of FIG. 5.

FIG. 8 shows a third modification of the arrangement of FIG. 5.

FIG. 9 shows a fourth modification of the arrangement of FIG. 5.

FIG. 11 shows a third modification of the airbag module of FIG. 1.

FIG. 12 shows a detail of the airbag module of FIG. 11 in the region of a device for controlling the outlet cross-section of a vent opening.

FIG. 13 shows an interior view of a partial region of the gas bag of FIG. 11 in the region of the device for controlling the outlet cross-section of a vent opening.

FIG. 14 shows a fourth modification of the airbag module of FIG. 1.

FIG. 15 shows an interior view of a partial region of the gas bag of FIG. 14 in the region of a device for controlling the outlet cross-section of a vent opening.

FIG. 16 shows the airbag module of FIG. 14 after closing the initially open vent opening.

FIG. 17 shows a representation according to FIG. 15 after closing the initially open vent opening.

FIG. 19 shows an interior view according to FIG. 10 in a modified embodiment.

FIG. 20 shows a detail of FIG. 19 in a first modification.

FIG. 21 shows a detail of FIG. 19 in a second modification.

FIG. 24 shows a fifth modification of the airbag module of FIG. 1.

FIG. 25 shows an interior view of a partial region of the gas bag of FIG. 24 in the region of a device for controlling the outlet cross-section of a vent opening;

FIG. 26 shows the airbag module of FIG. 24 after opening the initially closed vent opening;

FIG. 27 shows a representation according to FIG. 25 after opening the initially closed vent opening;

FIG. 28 shows a representation according to FIG. 5 in an additional modification;

FIG. 29 shows an interior view according to FIG. 10 in an additional modified embodiment.

DETAILED DESCRIPTION OF THE PREFERRED EMBODIMENTS

Figure 3:
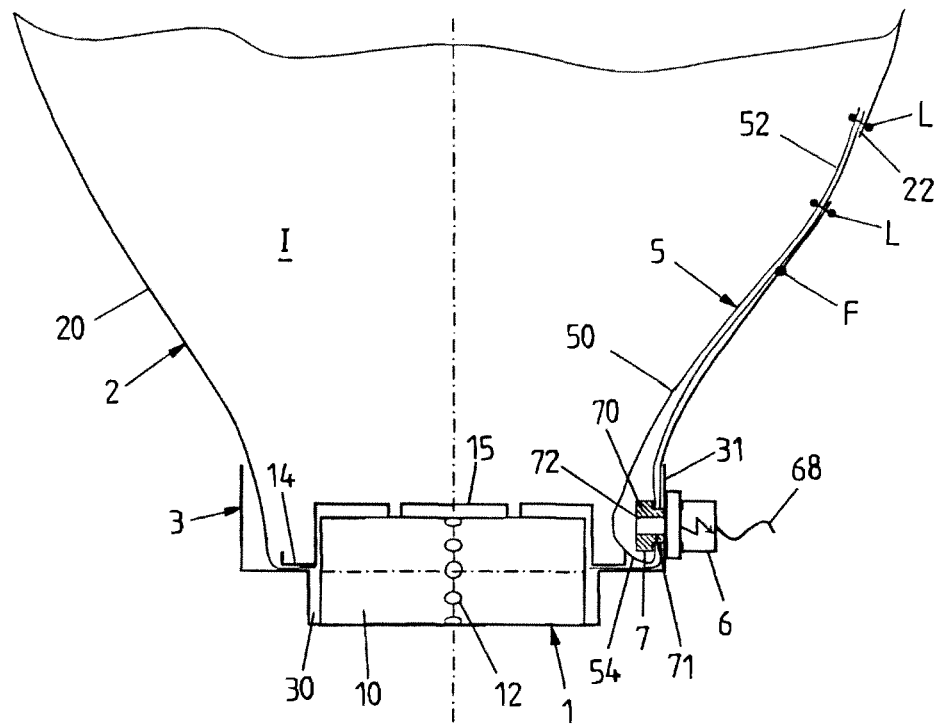
FIG. 3 shows a first modification of the exemplary embodiment of FIG. 1.

As essential components of an airbag module, FIG. 1 schematically shows a gas generator 1 for inflating a gas bag 2, which before inflation is stowed in a module housing 3 in a folded or gathered condition. The airbag module is shown in FIG. 1 in a condition in which the gas bag 2 already is at least partly filled with gas from the gas generator 1 and therefore has exited from the module housing 3.

The gas generator 1, which in a known manner comprises a housing 10, is filled with a cold gas and/or chemical substances for generating a hot gas and provided with outlet openings 12 through which gas can exit from the interior of the gas generator 1, in order to fill the gas bag 2 with gas, so that its envelope 20 unfolds and the gas bag 2 expands out of the module housing 3 for the protection of a vehicle occupant.

In the present case, the gas generator 1 protrudes in the usual way through a so-called inflation opening or an inflation orifice of the gas bag 2 into its interior I, so that gases exiting from the outlet openings 12 of the gas generator 1 can directly get into the interior I of the gas bag 2.

For fixing the gas bag 2 on or in the module housing 3, there are used holding means 4 in the form of a retaining ring which annularly surrounds the gas generator 1 (pot-shaped in the exemplary embodiment) and clampingly fixes the gas bag envelope 20 in the region of the inflation orifice, namely along the edge of the inflation orifice, in that the gas bag envelope 20 is clamped between that retaining ring 4 and a bottom 30 of the module housing 3 along the edge of the inflation orifice of the gas bag 2. The elements for fixing the holding means 4 on the module housing 3, which at the same time can also serve for generating the clamping force, are not shown here. For example, this can be screw, rivet or latching elements which can also be provided for attaching the gas generator 1 to the module housing 3.

For accommodating the gas generator 1 as well as the gas bag 2 before inflation, the module housing 3 includes the above-mentioned bottom 30 and in addition a lateral (circumferential) boundary wall 31 protruding therefrom.

In a region which during inflation of the gas bag gets outside the module housing 3, the gas bag 2 is provided with a vent opening 22 in its envelope 20, through which gas can exit from the interior I of the gas bag 2 into the surroundings.

In the condition of the airbag module with (partly) inflated gas bag as shown in FIG. 1, the vent opening 22 still is closed by a covering member 52, which in the exemplary embodiment is formed by a portion, more exactly by an end portion, of an inflatable element 5. With its end portion 52 serving as covering member, the inflatable element 5 therefore is fixed in the surroundings, i.e. along the edge of the vent opening 22 of the gas bag 2, on its envelope 20 via releasable connecting means L, e.g. in the form of at least one tear seam.

By way of example, the inflatable element 5 here is arranged in the interior I of the gas bag 2 and includes an envelope 50 (e.g. made of fabric), which can be filled with gas from a (pyrotechnical) gas source 6. The inflatable element 5 extends from the gas source 6 up to the vent opening 22 (in the manner of a gas duct) such that the vent opening 22 is covered by the (end) portion 52 of the inflatable element 5 serving as covering member and another end portion 54 of the inflatable element 5 is connected to the gas source 6 such that gas released from the gas source 6 enters into the inflatable element 5.

In the exemplary embodiment, the gas source 6 is connected with the module housing 3 (via non-illustrated fastening means), and here is arranged outside the module housing 3, e.g. below the housing bottom 30. Via a connection cable 68 it is connected with a controller which, for example controlled by sensors, can ignite a pyrotechnical charge of the gas source 6 via the connection cable 68, so that the same releases gas for filling the inflatable element 5.

For fixing the inflatable element 5 (within the module housing 3) such that the same can be filled with gas from the gas source 6 via its second end portion 54, a fastening element 7 is used, which is arranged inside the inflatable element 5, more exactly inside the second end portion 54 and is configured in a step-like form such that a first region 70 of the fastening element is located inside the inflatable element 5, while a second, stepped region 71 reaches through an opening of the inflatable element 5 and is fixed on the retaining ring 4, see also FIG. 5.

A fixation of the fastening element 7 on the retaining ring 4, so that in the end the inflatable element also is attached thereto, for example can be effected in a positive manner, in particular by latching. For this purpose, the fastening element 7 can be configured as a clip latchable (with its second region 71) into the associated opening of the retaining ring 4.

With its second region 71 protruding from the inflatable element 5 and reaching through the retaining ring 4 and in addition the gas bag 2 in the surroundings of its inflation orifice, the fastening element 7 extends up to the gas source 6 and is provided with a through opening 72 through which gas released from the gas source 6 can get into the interior of the inflatable element 5.

In addition to the fastening element 7, which at the same time serves for introducing gas, further fastening means can also be provided for fixing the inflatable element 5 on the retaining ring 4 and/or on the module housing 3, e.g. rivets.

In the exemplary embodiment, an (optional) firm connection furthermore is provided between at least one layer of the inflatable element 5 and the envelope 20 of the gas bag 2 spaced from the vent opening 22. More exactly, the permanently film connection F (along the direction of extension of the inflatable element 5) is located in a region between the vent opening 22 on the one hand and the gas source 6 on the other hand.

FIG. 2 shows the module of FIG. 1 after igniting the gas source 6 associated to the inflatable element 5, so that the former was filled with gas. Due to the pressure and possibly the temperature of the gases introduced into the inflatable element 5, the releasable connections L between the inflatable element 5 and the gas bag 2 are destroyed, so that no more connection exists between the edge regions of the vent opening 22 and the covering member formed by an end portion 52 of the inflatable element 5. As a result, that end portion 52 serving as covering member can be pushed through the vent opening 22 due to the internal pressure existing in the gas bag 2, so that said vent opening no longer is closed and a gas stream S from the interior I of the gas bag 2 can exit through the vent opening 22, in order to reduce the internal pressure of the gas bag—as desired on activation of the gas source 6.

The gas source 6 and the inflatable element 5 thus form an actuating mechanism for actuating the covering member 52.

FIG. 3 shows a first modification of the airbag module of FIG. 1, wherein a difference consists in that a diffuser 15 is associated to the gas generator 1, which possibly can also serve as generator support and which distributes the gases exiting from the gas generator 1 through the outlet openings 12 into the interior I of the gas bag 2. The retaining ring 14, via which the gas bag 2 is fixed inside the module housing 3 in the region of the edge of its inflation opening, here is integrally molded to the diffuser 15 (or possibly generator support) in the form of a flange. Furthermore, the diffuser 15 serves for fixing the gas generator 1 on or in the module housing 3.

Another difference consists in that the inflatable element 5 here is fixed on the module housing 3, more exactly on its lateral (circumferential) boundary wall 31, in the region of its gas-source-side end portion 54 via the fastening element 7, in that, similar to the arrangement of FIG. 1, a stepped second region 71 of the fastening element 7 reaches through an opening in the envelope 50 of the inflatable element 5 and engages in an opening in the module housing 3, more exactly in its boundary wall 31, and is fixed there, e.g. by latching.

In the exemplary embodiment of FIG. 3, like in the case of FIG. 1, the fastening element 7 furthermore can extend through an opening in the envelope 20 of the gas bag 2.

In the exemplary embodiment of FIG. 3, the gas source 6 in turn lies outside the module housing 3, but in this case beside its lateral boundary wall 31.

The fixation of the inflatable element 5 via the fastening element 7 on the module housing 3 also can be effected at some other point, e.g. in the region of the housing bottom 30. What is advantageous is a fixation in those regions which upon deployment of the gas bag 2 are exposed to comparatively low tensile loads caused by the same.

Figure 4:
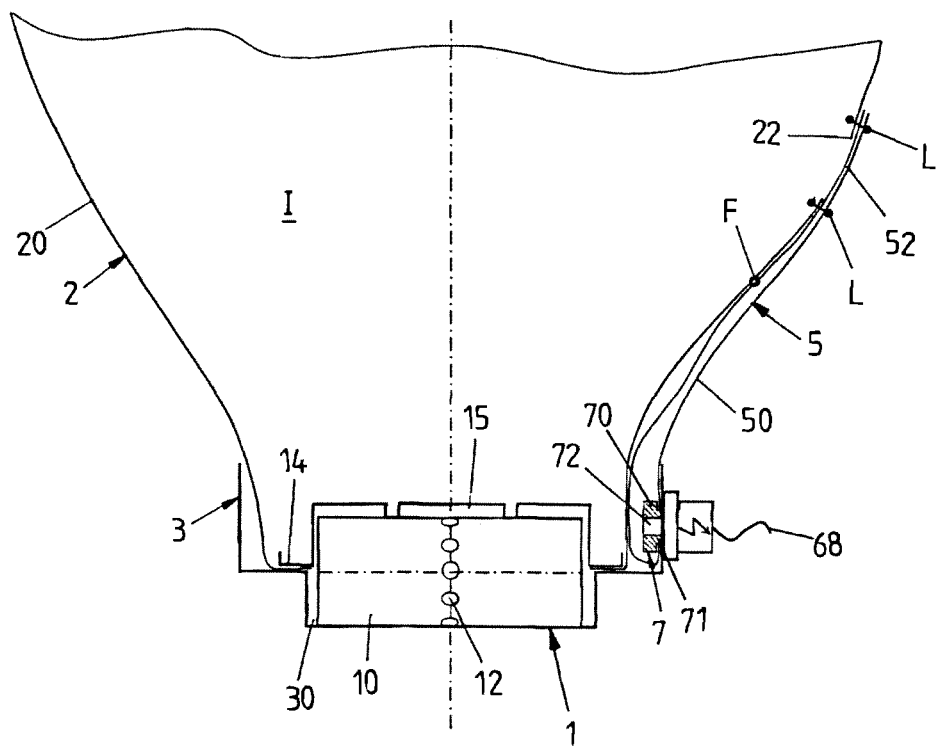
FIG. 4 shows a second modification of the exemplary embodiment of FIG. 1.

FIG. 4 shows a further modification of the exemplary embodiment of FIG. 1, namely based on the arrangement of FIG. 3, wherein the essential difference both to FIG. 1 and to FIG. 3 consists in that here the inflatable element 5 is arranged outside the gas bag 2, namely extends as gas duct along an outside of the envelope 20 of the gas bag 2 (instead of an extension as gas duct along an inside of the envelope 20 in the case of FIGS. 1 and 3).

In FIG. 5, the fixation of the inflatable element 5 in the region of its gas-source-side end portion 54 on the retaining ring 4 is shown in greater detail, namely by way of example for an exemplary embodiment according to FIG. 1.

In addition to the elements described already with reference to FIG. 1, which are also shown in FIG. 5 and provided with corresponding reference numerals, FIG. 5 proceeds from a module design in which the gas bag 2 in the non-expanded condition is enveloped by a film 25. This provides for generating a particularly small-volume gas bag package by evacuating the space enclosed by the envelope 20 after compressing or folding and packaging the gas bag 2 to a gas bag package, wherein the negative pressure can be maintained by the film 25 enveloping the gas bag 2. Upon activation of the gas generator 1 and the resulting deployment of the gas bag 2, the film 25 is destroyed.

Furthermore, the arrangement of FIG. 5, in contrast to FIG. 1, comprises an (elastic) sealing element 80 which (inside an opening 32 of the module housing 3 or inside its bottom 30) is arranged between the fastening element 7 and the gas source 6 and includes a through opening 80a through which gas released from the gas source 6 can get into the inflatable element 5 (after flowing through the further through opening 72 in the fastening element 7). Via this additional sealing element 80, the sealing of the gas-conducting connection 72, 80a between the gas source 6 and the inflatable element 5 is optimized, in that possible manufacturing tolerances of the individual module components can be compensated.

FIG. 6A shows a first modification of the arrangement of FIG. 5, wherein here the gas source 6 is partly surrounded by a sealing element 82 which is movable in gas exit direction of the gases from the gas source 6. The outer wall of the gas source 6 at the same time serves as guidance for the sealing element 82 which sectionally annularly encloses the gas source 6.

The sealing element 82 protrudes into an opening 32 of the module housing 3 or more exactly from its bottom 30 and is provided there with a through opening 82a for the gases released from the gas source 6, which has a smaller cross-section than the gas outlet opening of the gas source 6.

Due to the reduced cross-section of the through opening 82a of the sealing element 82, the gases released on activation of the gas source 6, cf. FIG. 6B, have the effect to urge the sealing element 82, which initially still is spaced from the fastening element 7, against the fastening element 7 and thereby sealingly place the two elements 7, 82 against each other. In this way, too, manufacturing tolerances of the module components to be connected can be compensated, corresponding to the arrangement explained with reference to FIG. 5. In the exemplary embodiment of FIGS. 6A and 613, however, in contrast to the arrangement of FIG. 5, the sealing of the gas-conducting connection 72, 82a between the gas source 6 and the inflatable element 5 is achieved only after activation of the gas source 6 and a resulting displacement of the sealing element 82, as is shown with reference to the transition from FIG. 6A to 6B.

For establishing a sealed gas-conducting connection between the gas source 6 and the inflatable element 5 via the fastening element 7, it is provided in the exemplary embodiment of FIG. 7 that on an end portion 74 of the fastening element 7 facing the gas source 6 a centering surface, e.g. in the form of a beveled or curved surface is provided, to which on the gas source side a corresponding counterpart 84 is associated, which in turn is provided with a gas through opening 84a, so that the fastening element 7 can sealingly engage in that gas-source-side counterpart 84, which can also be designed as elastic seal. Between the fastening element 7 and the gas-source-side counterpart 84, there can also extend the film 25 serving for enveloping the gas bag 2.

Beside sealing the gas-conducting connection between the gas source 6 and the inflatable element 5, the centering means 74, 84 from the exemplary embodiment of FIG. 7 also can have the function to align the module components during the assembly (transversely to the main deployment direction of the gas bag 2).

According to the exemplary embodiment of FIG. 8, which shows a third modification of the arrangement of FIG. 5, the inflatable element 5 is open on its gas-source-side end portion 54. This means that—in contrast to the embodiments of FIGS. 5 to 7—there is not provided an opening (true to size), through which the fastening element 7 with its stepped region 71 would have to extend. This also means that the fastening element 7 no longer must be positioned within the inflatable element before closing the inflatable element 5, e.g. by sewing corresponding fabric parts together.

Rather, in the exemplary embodiment of FIG. 8, a connection between the inflatable element 5 and the fastening element 7 possibly can only be made during module assembly, in that the inflatable element 5 is put over the fastening element 7 with its open gas-source-side end portion 54.

For fixing the gas-source-side end portion 54 of the inflatable element 5 on the fastening element 7, suitable fixing means are employed, in the exemplary embodiment in the form of a hose clamp 73.

Moreover, the exemplary embodiment of FIG. 8 corresponds with the arrangement of FIG. 5.

In the exemplary embodiment of FIG. 9, the fastening element 7 as integral part of the retaining ring 4 (or the diffuser 15 in the case of the arrangement of FIG. 3) is integrally molded to the same, e.g. integrally cast in the case of a cast part or formed by means of a stamp in a deep-drawn part of sheet metal, or also welded.

In the exemplary embodiment of FIG. 9 fixing the gas source 6, which here is located inside the module housing 3, is effected such that the same is inserted into a receptacle 30a of the module housing 3 or more exactly of the housing bottom 30 and thus can be clamped between the module housing 3 and the fastening element 7, wherein the gas source 6 is at least partly surrounded by the fastening element 7.

Figure 10:
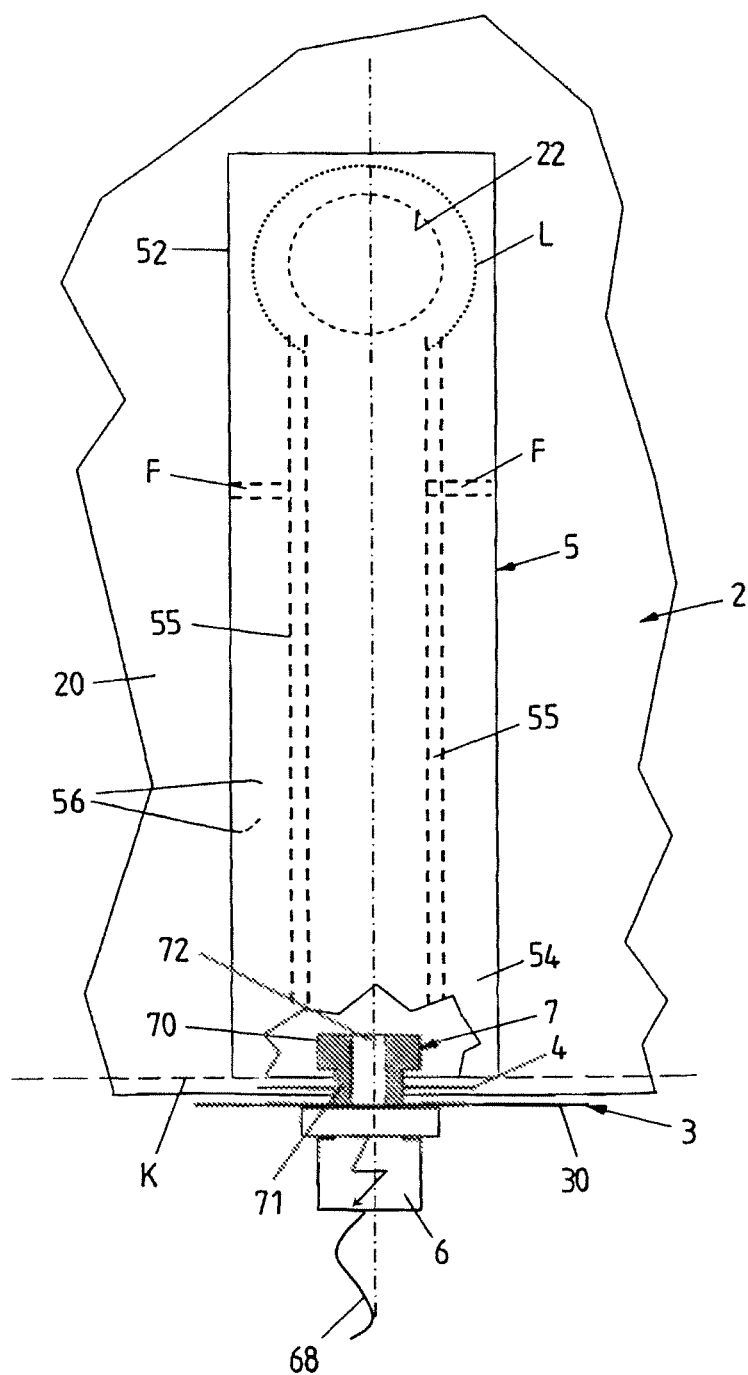
FIG. 10 shows an interior view of a partial region of the gas bag of FIG. 1 in the region of a device for controlling the outlet cross-section of a vent opening.
Figure 18:
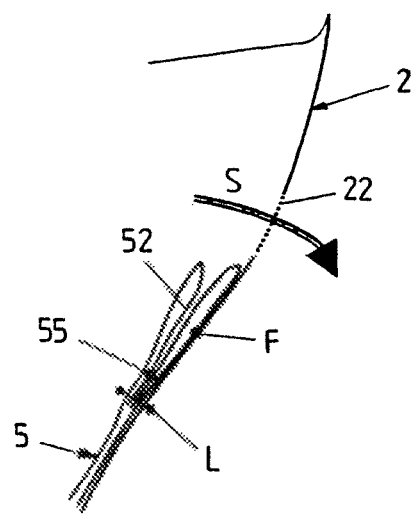
FIG. 18 shows a modification of the exemplary embodiment of FIG. 14 in the region of the vent opening.

FIG. 10 shows an interior view of the gas bag 2 of FIG. 1 in the region of the inflatable element 5, by means of which in particular the design of the inflatable element 5 and its connection with the envelope 20 of the gas bag 2 will be explained.

The inflatable element 5 or its envelope 50 here is formed by a one-part blank, e.g. of a fabric material, i.e. in particular a material which can also be used for manufacturing the envelope 20 of the gas bag 2. The blank is folded over once along a line of symmetry or a folding line K and the two segments 56 of the blank lying one on top of the other are firmly connected with each other on connecting lines 55 along their lateral edge regions for forming a duct- or hose-shaped inflatable element 5 (gas duct). The connection for example can be effected by sewing, gluing or welding. A connection to the envelope 20 of the gas bag 2 preferably does not exist at these points.

On the gas-source-side end portion 54, the blank has an opening through which a stepped region 71 of the fastening element 7 arranged therein extends, as has been described already with reference to FIG. 1.

With its vent-opening-side end portion 52 the blank is fixed on the envelope 20 of the gas bag 2 via releasable connecting means L, e.g. in the form of a tear seam, and in the exemplary embodiment the releasable connecting means L annularly enclose the vent opening 22.

Between the gas-source-side end portion 54 and the vent-opening-side end portion 52, the inflatable element 5 also is permanently fixed on the envelope 20 of the gas bag 2 via firm, permanent connecting means F.

As an alternative to the one-part blank shown in FIG. 10, which can be folded over about a line of symmetry or folding line K extending transversely (with respect to the longitudinal extension of the inflatable element 5), there can also be used a one-part blank which is to be folded over about a line of symmetry or folding line extending in direction of extension of the inflatable element (i.e. transversely to the folding line K of FIG. 10). In this case, the line of symmetry or folding line would extend substantially along the flow direction of the gases exiting from the gas source 6. In this embodiment, the inflatable element 5 additionally is closed on its gas-source-side end via suitable connecting means, while—as compared to the arrangement of FIG. 10—only one of the longitudinally extending connecting lines 55 is required.

Another possibility consists in manufacturing the inflatable element from two separate blanks which are firmly connected with each other along their edge regions, in particular three edge regions.

It should be noted that different features of the exemplary embodiments described above can be combined with each other and that the type of module each shown there by way of example (in the form of a driver and passenger airbag module) is not to be understood in a limiting way, but the corresponding arrangements also are applicable to other airbag modules.

FIG. 11 shows a modification of the exemplary embodiment of FIG. 3, but with an inflatable element 5 open on its gas-source-side end portion 54, as is shown for example in FIGS. 8 and 9. The open gas-source-side end portion 54 of the inflatable element 5 is mounted (clamped) between an edge portion (flange) of a diffuser 15 formed as retaining ring 14 and the bottom 30 of a module housing 3 (or possibly also of a generator support) and thereby is closed in a gas-tight manner, as can be seen in particular also with reference to the enlarged detail representation of FIG. 12.

In the arrangement of FIGS. 11 and 12, in contrast to the preceding exemplary embodiments, the gas source 6 associated to the inflatable element 5 no longer is fixed on a component of the airbag module, such as a retaining ring, the module housing or a generator support, directly via a fastening element, but rather is arranged substantially freely movable within the inflatable element 5. For holding the gas source 6, the electric connecting line 68 thereof is used in this case, via which the gas source is connected with a control unit for activation. In the exemplary embodiment, this line 68 together with the open gas-source-side end portion 54 of the inflatable element 5 is clamped between a retaining ring 14 and the housing bottom 30. The connecting line 68 at the same time is guided out of the open end portion 54 of the inflatable element 5.

FIG. 13 shows an interior view of the gas bag 2 of FIG. 11 in the region of the inflatable element 5, corresponding to the representation as shown in FIG. 10. As regards configurations of the arrangement of FIG. 13 corresponding with FIG. 10, reference is made to the explanations of FIG. 10.

According to FIG. 13, the inflatable element 5 consists of two blanks 56 which are (firmly) connected with each other along their long sides on connecting lines 55 (extending with a slight inclination to each other), so that between the same a (hose-shaped) gas duct is formed, which connects the gas source 6 with the vent-opening-side end portion 52 (covering member).

On the gas-source-side end portion 54 of the inflatable element 5, the connecting lines extend such that they define two constrictions 57, 59 (throats) spaced from each other in direction of extension of the inflatable element 5, between which a widened region 58 of the inflatable element is located. The gas source 6 is captively arranged therein, in that the constrictions 57, 59 are designed such that they do not allow slipping out of the gas source 6. Expressed in other words, the gas source 6 is caught in the widened region 58 on the gas-source-side end portion 54 of the inflatable element 5.

For assembly, the gas source 6 is squeezed through the end-side constriction 59, so that it can be introduced into the widened region 58. The other constriction 57 is designed such that the gas source 6 cannot pass through the same to enter further into the inflatable element 5, so that said constriction 57 acts in the manner of an end stop.

Furthermore, as a result of the dimensioning of the inner constriction 57, through which the gas released by the gas source 6 passes when it flows into the inflatable element 5, the flow velocity of the gases exiting from the gas source 6 can selectively be influenced, which is important for the intended destruction of the releasable fixation L of the inflatable element 5 on the gas bag 2.

In the exemplary embodiment of FIGS. 11 to 13 as well, the inflatable element 5 can alternatively be arranged outside the gas bag 2.

In FIGS. 14 to 15 a modification of the exemplary embodiment of FIGS. 1 and 10 is shown, according to which the vent opening 22 initially, i.e. before filling the inflatable element 5 by means of the gas source 6, is open and provides for a gas stream S from the interior I of the gas bag 2 to the outside.

According to this exemplary embodiment, the total outflow cross-section of the vent openings (including possible additional permanently open vent openings) of the gas bag 2 in its starting condition already is designed for a crash situation, in which a maximum outflow of gas from the gas bag 2 is required or expedient from the start. Such constellations can exist, for example, when the occupant to be protected is disposed very close to the airbag module (so-called oop situation), or when the weight force of the occupant is recognized as too small, i.e. the internal pressure existing in the gas bag must quickly be decreased. For such situations detectable by sensors, the present design offers time advantages, since no mechanisms must be actuated before the vent opening 22 is open for the outflow of gas.

Of course, permanently open vent openings of a gas bag and vent openings controlled in terms of their outlet cross-section, namely both originally closed vent openings and originally open vent openings as well as possibly partly covered vent openings, can suitably be combined with each other.

Furthermore, an additional connecting region 55a can be provided between the two opposed layers 56 of the inflatable element 5, which extends between the two connecting lines 55 at the lateral edge regions and thus firmly closes the inflatable element 5 also on its vent-opening-side end portion 52.

In the present case, the vent-opening-side end portion 52 of the inflatable element 5, which serves as covering member, is folded back once, so that it does not cover the vent opening 22, but rather lies on a section of the inflatable element 5 itself. Alternatively, said end portion 52 of the inflatable element 5 for example can also be folded over such that outside the vent opening 22 it directly rests against the inside of the gas bag 2 or more exactly at the gas bag envelope 20. In the position folded over, in which the vent opening 22 is exposed, the vent-opening-side end portion 52 of the inflatable element 5 is fixed by means of a releasable fixation L, e.g. in the form of a tear seam, on the envelope 20 of the gas bag 2 or on the inflatable element 5 itself.

The folding edge, about which the end portion 52 of the inflatable element 5 serving as covering member is folded over, is disposed directly adjacent to the vent opening 22.

Furthermore, the vent opening 22 here is formed as a group of holes with a plurality of vent holes 22a, 22b, 22c, 22d, between which material regions (fabric regions) of the gas bag envelope, e.g. in the form of webs, each are located. It thus is prevented that after filling the inflatable element 5 due to the activation of the gas source 6 and the related rupture of the releasable fixation L and the subsequent folding over of the end portion 52 of the inflatable element 5 serving as covering member, the same is pushed through the vent opening 22 and the latter is opened again. The group of holes 22a, 22b, 22c, 22d forming the vent opening 22 for example can be produced by incorporating corresponding holes into the gas bag envelope 20. Alternatively, however, it is also possible to attach the group of holes as separate element to the gas bag envelope, so that it covers an opening of the gas bag envelope. The group of holes also can be formed by a net-like material (fabric) with a defined mesh width.

As can be seen with reference to FIGS. 16 and 17, after filling the inflatable element 5 with gas and tearing open the releasable connection L, e.g. as a result of pressure and/or temperature of the gases flowing from the gas source 6 into the inflatable element 5, the inflatable element 5 is stretched. In the process, the end portion 52 originally folded back moves over the vent opening 22 formed by a group of holes and covers the same as covering member. The vent opening 22 is closed thereby, wherein the corresponding end portion 52 of the inflatable element 5 is held in the position covering the vent opening 22, namely urged against the inner wall of the gas bag envelope 20, by the internal pressure of the gas bag 2. Then, a gas stream from the gas bag through the vent opening 22 to the outside no longer is possible.

In dependence on the time of activation of the gas source 6 as actuating mechanism for the covering member formed by the end portion 52, the airbag arrangement can be adapted to different crash situations.

In a detail representation in the region of the vent opening 22, FIG. 1 shows a modification of the exemplary embodiment of FIGS. 14 and 15 to the effect that on its vent-opening-side end portion 52 serving as covering member the inflatable element 5 is inverted to the inside and is held in this condition by means of a releasable fixation L.

In an interior view of a gas bag in the region of the inflatable element 5, which corresponds to FIG. 10, FIG. 19 shows a development of the arrangement of FIGS. 1 and 10.

Like in the exemplary embodiment of FIGS. 14 to 17, an additional connecting region 55a accordingly is provided between the two opposed layers 56 of the inflatable element 5, which here encloses the vent opening 22 and the releasable connection L between the inflatable element 5 and the envelope 20 of the gas bag 2.

In the exemplary embodiment of FIG. 19, the releasable fixation L, for example in the form of a tear seam which extends around the vent opening 22, thus no longer forms the (releasable) outer closure of the gas conducting channel formed by the inflatable element 5, but it rather is enclosed by an additional firm connection 55a between the two layers 56 of the inflatable element. As seen in radial direction, the releasable fixation L thus extends between the vent opening 22 and the end-side firm connection 55a of the two layers 56 of the inflatable element 5.

In such an arrangement, apart from gas leakages, the entire energy of a gas exiting from the gas source and entering into the inflatable element 5 is available for releasing the releasable connection L, since the inflatable element 5 and the gas duct formed thereby define a closed volume. Thus, a destruction of the releasable connection L can be achieved with less gas or also less hot gases, so that when using a pyrotechnical gas source 6, a correspondingly smaller pyrotechnical charge is required.

FIG. 20 shows a detail view of a first modification of the exemplary embodiment of FIG. 19, according to which the releasable connection L' is formed by a plurality of connecting regions spaced from each other in circumferential direction. This facilitates releasing of the fixation and advantageously can be combined with the additional firm connection 55a of the two layers 56 of the inflatable element 5.

FIG. 21 shows a detail view of a further modification of the exemplary embodiment of FIG. 19, according to which the releasable fixation L" includes indentations arranged one behind the other in circumferential direction, which each are pointed in direction of the vent opening 22. When filling the inflatable element 5 with gas, particularly great stresses (stress peaks) occur at these pointed sections, so that there the releasable fixation L" can particularly easily be destructed by the occurring forces, whereby releasing of the fixation as a whole is facilitated.

In the exemplary embodiment of FIG. 21, the releasable fixation L" is provided as a continuous fixation, so that it can easily be employed also without the additional firm connection 55a between the two layers 56 of the inflatable element 5. Alternatively, however, a design with interruptions also is conceivable, similar to FIG. 20.

Figure 22:
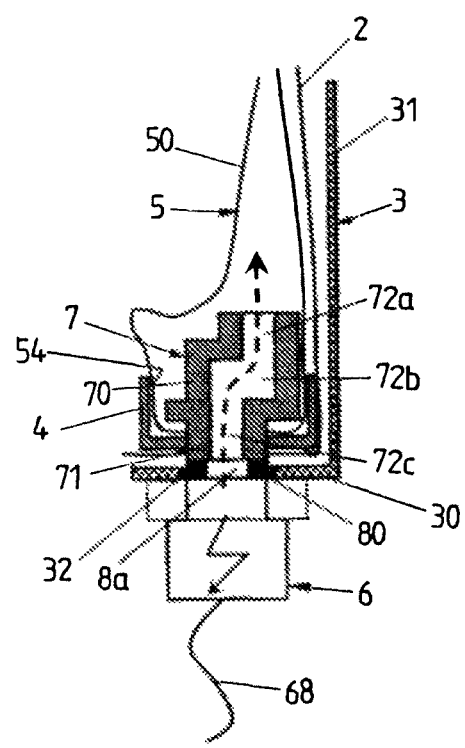
FIG. 22 shows a representation according to FIG. 5 in a further modification.

Based on the arrangement according to FIG. 5, FIG. 22 shows a further possible design of a fastening element 7 for fastening the gas-source-side end portion 54 of the inflatable element 5. Accordingly, the through opening provided in the fastening element 7 for the gases exiting from the gas source 6 is designed such that it consists of several sections 72a, 72b, 72c which effect a deflection of the gas stream between the entry (from the gas source 6) and the exit (into the inflatable element 5). In this way, the exit direction of the gas stream can be changed or varied relative to the entry direction.

Figure 23:
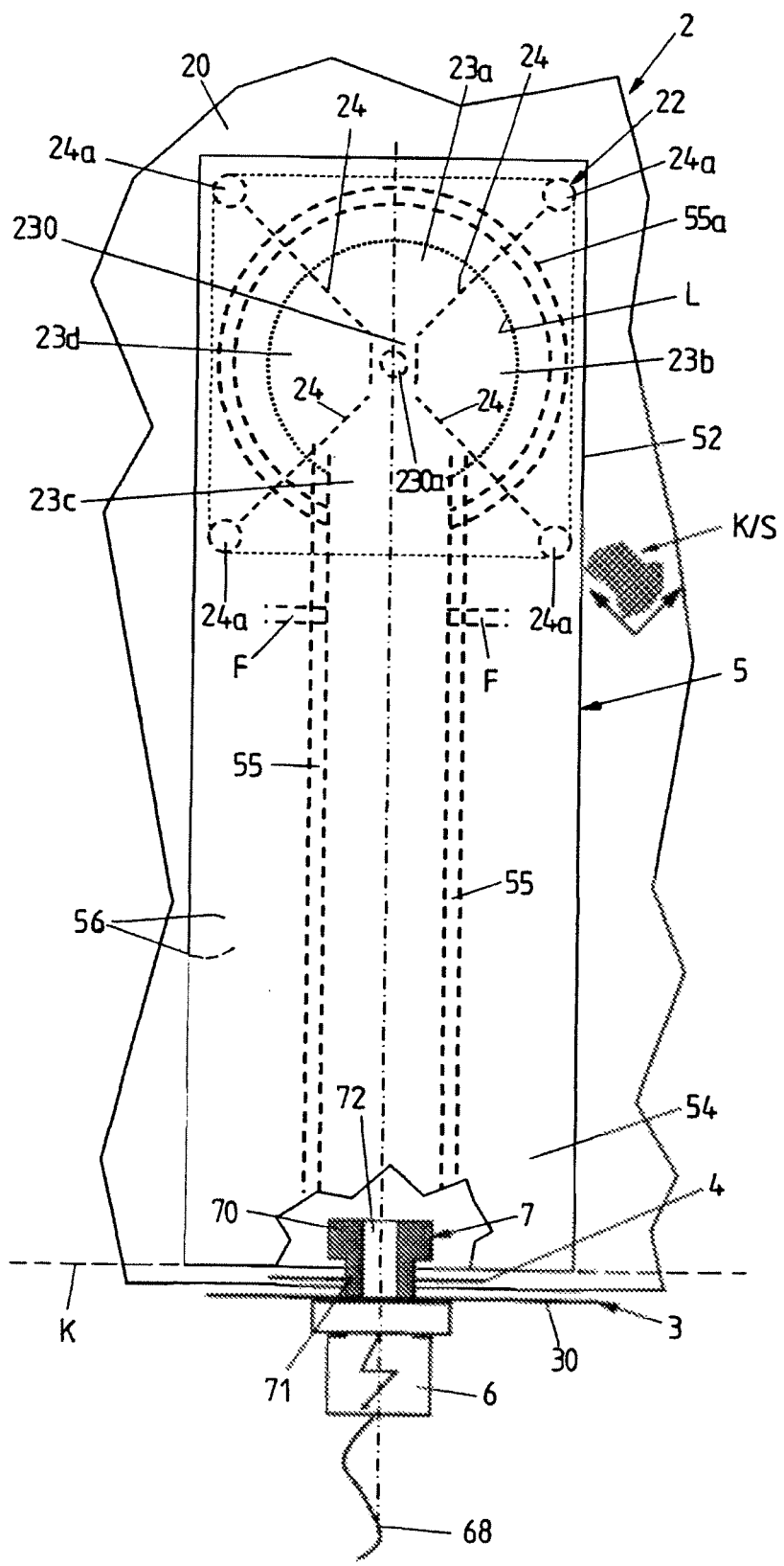
FIG. 23 shows an interior view of a gas bag in the region of a device for controlling the cross-section of a vent opening.

FIG. 23 shows a further exemplary embodiment in an interior view, namely in modification of the corresponding view of FIG. 10, wherein on the one hand an additional firm connection 55a surrounding the releasable connection L is provided between the two layers 56 of the inflatable element, as has already been explained above in detail with reference to FIGS. 15 and 19. Like in FIG. 10, there is also shown the condition of the arrangement with non-activated gas source 6.

A further difference to the exemplary embodiment of FIG. 10 consists in the configuration of the vent opening 22. In the exemplary embodiment of FIG. 23, the vent opening 22 is formed by (four) radially extending slots 24 in the material of the envelope 20 of the gas bag 2, which form or define (four) segments 23a, 23b, 23c, 23d in the envelope 20 of the gas bag 2, which for clearing a through opening for the gas present in the gas bag 2 can be folded over as soon as the releasable fixation L between the inflatable element 5 and the envelope 20 of the gas bag 2 is eliminated, which connects said segments 23a, 23b, 23c, 23d with the vent-opening-side end portion 52 of the inflatable element 5. In the view of FIG. 23, the slots 24 protrude beyond the releasable fixation L, i.e. the area enclosed by the releasable fixation L is smaller than the cross-section of the vent opening 22 obtained after folding over the segments 23a, 23b, 23c, 23d.

Towards the outside, the slots 24 forming the vent opening 22 each end in (circular) openings 24a which are meant to prevent a further rupture of the material of the gas bag envelope 20 in a load case. Furthermore, the slots 24 advantageously extend in warp and weft direction K/S of a fabric forming the gas bag envelope.

To facilitate the assembly, in particular the fixation of the inflatable element 5 on the gas bag envelope 20 in the region of the segments 23a, 23b, 23c, 23d, two (opposed) segments 23a, 23c are connected with each other via a (central) connecting region 230. This is achieved in that the slots 24 forming the vent opening 22 end in the central region of the vent opening 22 at a distance from each other, so that between the inner ends of the slots 24 a web is formed, which as connecting region 230 connects said two segments 23a, 23c with each other.

The web-like connecting region 230 additionally can be provided with a weakening opening 230a, in order to facilitate the rupture of the connecting region 230, so that in the end four loose segments can be formed, when the releasable fixation L is destroyed on filling the inflatable element 5 with gas, and the segments 23a, 23b, 23c, 23d no longer are connected with the inflatable element 5.

As seen from the center of the vent opening, i.e. from the weakening opening 230a, the releasable fixation L in the exemplary embodiment extends between that center and the swivel regions about which the segments 23a, 23b, 23c, 23d can be pivoted. The latter substantially are defined by the location of the openings 24a in which the slots 24 end. In the present case, the swivel regions each are formed by the (imaginary) connecting lines between adjacent openings 24a, as is indicated in FIG. 23 with a thin broken line. In the exemplary embodiment of FIG. 23, the swivel regions extend parallel to the edges of the inflatable element 5 and adjacent to the same.

With the configuration of the vent opening 22 as shown in FIG. 23 and described above including an appropriate arrangement of the releasable connection L between gas bag 2 and inflatable element 5, a number of additional advantages are obtained: Once the design of the inflatable element 5, especially of the gas duct formed thereby, has been completed in particular as regards the adjustment with respect to the gas source 6 and the dimensioning of the releasable fixation L and of the additional connecting region 55a, it can be used for different sizes of the vent opening 22, wherein that size can simply be adapted to different conditions via the length of the slots 24 defining the vent opening 22. In the condition shown in FIG. 23, the slots 24 also can extend beyond the outer edge of the inflatable element 5.

A further advantageous feature of the releasable fixation L is its overlapping extension with the lateral connecting lines 55 of the inflatable element 5. This provides for a fast build-up of pressure in the interior of the inflatable element 5 for destroying the releasable connection L, since the latter and the lateral connecting lines 55 define a closed volume in the non-activated condition of the additional gas source 6.

In FIGS. 24 and 25 a modification of the exemplary embodiment of FIGS. 1 and 10 is shown, wherein the representation of FIG. 24 corresponds to FIG. 1 and the representation of FIG. 25 corresponds to FIG. 10. In the following, in particular those aspects of the exemplary embodiment of FIGS. 24 and 25 will be described, in which the same differs from the exemplary embodiment of FIGS. 1 and 10. Moreover, reference is made to the description of the airbag module shown in FIGS. 1 and 10.

According to FIGS. 24 and 25, the end portion of the inflatable element 5 forming the covering member 52 consists of two sections 52a, 52b which are folded over each other, so that they each are arranged above the vent opening 22 of the gas bag 2. The one section 52a directly adjoins the vent opening 22 and the gas bag regions surrounding that vent opening 22, whereas the other section 52b covers the one section 52a. The two sections 52a, 52b of the covering member 52 each consist of two layers 56 of the inflatable element 5.

The one section 52a of the covering member 52 is provided with a through opening 53 which is arranged with respect to the vent opening 22 such that gas from the interior I of the gas bag 2 might exit through the through opening 53 and the vent opening 22 into the surroundings. For this purpose, the one section 52a of the covering member 52 is fixed on the gas bag 2 or more exactly on its envelope 20 by means of a permanent, firm connection F'' such that the vent opening 22 and the through opening 53 cover each other and are in alignment with each other. Concretely, the firm connection F' between the first section 52a of the covering member 52 and the gas bag 2 annularly (circularly) extends around the vent opening 22 and the through opening 53, namely in particular along a closed contour.

The other, second section 52b of the covering member 52 initially closes the vent opening 22 and the through opening 53, as it is folded over those openings and is fixed in this position by means of a releasable connection L, here in the form of a seam, via which the second section 52b (in the region of its free end) is connected with the gas bag 2 or its envelope 20 (and in the exemplary embodiment also with the covering member 52 and its first section 52a).

In the exemplary embodiment, the releasable connection L is made such that it forms a boundary between the gas-source-side end portion 54 and the end portion 52 of the inflatable element 5 forming the covering member, namely such that gas flowing into the gas-source-side end portion 54 only can get into the end portion 52 of the inflatable element 5 forming the covering member, when the releasable connection L has been undone. When gas released by the gas source 6 flows into the inflatable element 5, only a region of the inflatable element 5, namely the gas-source-side end portion 54, initially is filled with gas, whereby a correspondingly large pressure is built up, which has the tendency to undo the releasable connection L. In this way, it can be ensured with great certainty that this connection is undone upon release of a gas from the gas source 6.

In the region of its free end, the end portion 52 of the inflatable element 5 forming the covering member or more exactly its other, second section 52b, like in the exemplary embodiment of FIGS. 14 to 17, is closed by means of an additional connecting region 55a.

In addition to the firm connection F', which extends around the vent opening 22 and the through opening 53 along a closed contour, an additional firm connection F can be provided for connecting the inflatable element 5 to the gas bag 2 or its envelope 20, corresponding to the arrangement of such connection F in the exemplary embodiment of FIGS. 1 and 10.

Upon activation of the gas source 6, with the aim to clear the vent opening 22, the gas released by the gas source 6 initially flows into the gas-source-side end portion 54 of the inflatable element 5 without being able to pass over into the end portion 52 forming the covering member, as the releasable connection L in the form of a tear seam initially separates the two end portions 52, 54 of the inflatable element 5 in a substantially gas-tight manner. The releasable connection L thus defines a pre-chamber in the inflatable element 5, which is formed by its gas-source-side end portion 54 and which initially receives the entire gas released by the gas source 6. In that region of the inflatable element 5, a correspondingly high internal pressure thereby is generated, which in turn leads to correspondingly high forces acting on the releasable connection L in the form of a tear seam, so that the same finally is undone, i.e. tears open in the exemplary embodiment.

After undoing the releasable connection L, the gases flow into the end portion 52 of the inflatable element 5 forming the covering member and in particular fill its two sections 52a, 52b, whereby the other, second section 52b is folded over and thus clears the through opening 53 provided in the one, first section 52a as well as the vent opening 22 of the gas bag 2, see also the transition from FIGS. 24 and 25 to FIGS. 26 and 27, which show the situation after clearing the vent opening 22 in corresponding representations.

A gas stream S through the through opening 53 and the vent opening 22 then can exit from the interior I of the gas bag 2 into the surroundings.

An advantage of the design of the covering member 52 and the inflatable element 5 described with reference to FIGS. 24 to 27 consists in that for completely clearing the outlet cross-section of the vent opening 22 no material of the covering element 52 or of the inflatable element 5 must be pressed into or through the vent opening 22.

Folding over the other section 52b of the covering member 52 for clearing the vent opening 22 for example can be influenced by the expansion of the sections 52a, 52b transversely to the flow direction of the gas released by the gas source 6, i.e. in particular by the arrangement and extension of the lateral connecting lines 55. Thus, their extension by no means must necessarily be parallel, as is shown in FIGS. 25 and 27. For example, there can be provided a greater distance between the opposed connecting lines 55 adjacent to the gas outlet region.

FIG. 28 shows an additional modification of the arrangement of FIG. 5, namely without the protective film (25) and the sealing element (80) provided there, wherein the essential difference to the arrangement of FIG. 5 moreover consists in the configuration of the fastening element 7, which serves for fastening the inflatable element 5 (inside the module housing 3).

The fastening element 7, in so far still in correspondence with the exemplary embodiment of FIG. 5, comprises a first region 70 which is located inside the inflatable element 5 as well as an offset second region 71 which extends through an opening of the inflatable element 5 and is fixed at the retaining ring 4.

In the exemplary embodiment of FIG. 28, the fastening element 7 is designed as a rivet whose first region 70 forms a rivet head and whose second region 71 extends as rivet shank through said opening of the inflatable element 5 and through a further opening in the retaining ring 4. Concretely, the fastening element 7 is formed as hollow rivet which includes a through opening 72 through which gas released by the gas source 6 can flow into the interior of the inflatable element 5.

For fixing the fastening element 7 on the retaining ring 4, so that in particular the inflatable element 5 thereby is (clampingly) attached to the retaining ring 4, a third region 70' of the fastening element 7 presently is provided opposite to the first region (rivet head) and adjoining the second region 71, which protrudes beyond the retaining ring 4 in a direction away from the first region 70 and is plastically deformed for forming a rivet connection, for example has been beaded. As a result, the third region 70' forms an undercut, so that in the end the retaining ring 4 in the region of the edge of its opening, through which the fastening element 7 extends, is accommodated between the first region 70 and the third region 70' of the fastening element 7, namely together with the inflatable element 5 to be attached to the retaining ring 4.

The fastening element 7 with its third region 70' furthermore can extend through an opening in the envelope 20 of the gas bag 2. This means that the third region 70' then is laterally surrounded by the opening in the envelope 20.

FIG. 29 shows a modification of the arrangement of FIG. 10, namely by way of example by using a fastening element 7 in the form of a rivet, as shown in FIG. 28, which as regards the further differences between the arrangements of FIG. 29 on the one hand and FIG. 10 on the other hand, however, is not absolutely necessary. This means that the remaining modifications of FIG. 29 as compared with FIG. 10 also can be realized when using a fastening element other than shown in FIGS. 28 and 29.

In contrast to the exemplary embodiment of FIG. 10, the distance between the connecting lines 55 along which two segments 56 lying on top of each other are connected with each other for forming an inflatable element 5 (at their edge regions), presently is greater than the diameter of the vent opening 22. In the exemplary embodiment, the connecting lines 55 extend parallel to each other; they can, however, also be arranged at an angle to each other or more generally have a curve-shaped extension. In one development, the distance of the connecting lines 55 adjacent to the gas source 6 also can be smaller than adjacent to the vent opening 22.

According to a further difference to the arrangement of FIG. 10, the releasable connecting means L presently extend in a bell-shaped manner around the vent opening 22, for example in the form of a double bell-shaped tear seam.

The priority applications, German Patent Application 10 2010 024 384.1, filed Jun. 15, 2010; German Patent Application 10 2010 039 895.0, filed Aug. 27, 2010 and German Patent Application 20 2011 001 429.0, filed Jan. 6, 2011 are incorporated by reference herein.

What is claimed is:

1. An airbag module for a motor vehicle, comprising a gas bag which for the protection of a person is inflatable by means of a gas generator, a vent opening through which gas originating from the airbag module can escape, and a device for controlling the outlet cross-section of the vent opening, which comprises at least one covering member with which the vent opening can be covered, in order to at least partly close the same, and which furthermore comprises an actuating mechanism which cooperates with the covering member, in order to vary the outlet cross-section of the vent opening, wherein the actuating mechanism includes a gas source and an element inflatable by means of the gas source, which during inflation cooperates with the covering member such that it effects a change in the outlet cross-section of the vent opening, wherein the inflatable element in the surroundings of the gas source is attached to a module component which serves at least one of the fixation of the gas bag on the airbag module and the accommodation of the gas bag in the airbag module, and wherein the vent opening is provided on the gas bag.

2. The airbag module according to claim 1, wherein the inflatable element forms a gas duct which extends from the gas source to the covering member.

3. The airbag module according to claim 1, wherein the inflatable element is attached to the module component in a region of a gas-source-side end portion of the inflatable element in the surroundings of the gas source.

4. The airbag module according to claim 1, wherein the inflatable element is attached to the module component by means of at least one additional fastening element.

5. The airbag module according to claim 1, wherein the inflatable element is attached to a module component which during inflation of the gas bag does not substantially change its position in the airbag module.

6. The airbag module according to claim 1, wherein the module component is arranged in the interior of the gas bag.

7. The airbag module according to claim 1, wherein the module component is formed by a holding member which serves the clamping fixation of the gas bag in the region of its inflation opening on the airbag module.

8. The airbag module according to claim 1, wherein the module component is formed by at least one of a generator support, a diffuser, and a retaining ring extending beside the gas generator.

9. The airbag module according to claim 1, wherein the inflatable element is fixed on a module component in which the gas bag is arranged before inflation or which adjoins the gas bag.

10. The airbag module according to claim 9, wherein the module component is formed by at least one of a module housing and a generator support.

11. The airbag module according to claim 1, wherein at least one fastening element, which is provided for attaching the inflatable element to a module component, is provided with a through opening for introducing gases exiting from the gas source into the inflatable element.

12. The airbag module according to claim 1, wherein the vent opening is formed by a group of holes.

13. The airbag module according to claim 1, wherein the vent opening is formed by slots in an envelope of the gas bag, which define hinged segments in that envelope.

14. The airbag module according to claim 13, wherein the hinged segments are connected with the covering member via a releasable connection.

15. The airbag module according to claim 1, wherein the vent opening is enclosed by a releasable fixation of the covering member on an envelope of the gas bag.

16. The airbag module according to claim 1, wherein the covering member is formed by a portion of the inflatable element.

17. The airbag module according to claim 1, wherein on an end portion in the region of the covering member the inflatable element is firmly closed by an additional connecting region.

18. The airbag module according to claim 1, wherein for closing the vent opening the covering member rests on the vent opening with two sections, of which the one section includes a through opening which permits the exit of gas from the gas bag through the vent opening, and of which the other section closes the vent opening together with the through opening.

19. The airbag module according to claim 18, wherein the one section is permanently connected with the gas bag and the other section is releasably connected with the gas bag.

20. The airbag module according to claim 18, wherein during inflation of the inflatable element the other section is moved away from the vent opening.

* * * * *